(12) United States Patent
Lee et al.

(10) Patent No.: US 10,506,501 B2
(45) Date of Patent: Dec. 10, 2019

(54) SERVICE DISCOVERY METHOD AND DEVICE IN WIRELESS COMMUNICATION SYSTEM

(71) Applicant: LG ELECTRONICS INC., Seoul (KR)

(72) Inventors: Byungjoo Lee, Seoul (KR); Wookbong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 57 days.

(21) Appl. No.: 15/307,733

(22) PCT Filed: Apr. 29, 2015

(86) PCT No.: PCT/KR2015/004363
§ 371 (c)(1),
(2) Date: Oct. 28, 2016

(87) PCT Pub. No.: WO2015/167269
PCT Pub. Date: Nov. 5, 2015

(65) Prior Publication Data
US 2017/0055203 A1    Feb. 23, 2017

Related U.S. Application Data

(60) Provisional application No. 61/985,478, filed on Apr. 29, 2014.

(51) Int. Cl.
*H04W 48/16* (2009.01)
*H04W 80/00* (2009.01)
(Continued)

(52) U.S. Cl.
CPC ........... *H04W 48/16* (2013.01); *H04L 69/161* (2013.01); *H04W 4/50* (2018.02); *H04W 92/18* (2013.01); *H04W 84/12* (2013.01)

(58) Field of Classification Search
CPC ... H04W 48/16; H04W 48/10; H04W 76/023; H04W 84/13; H04L 67/16
(Continued)

(56) References Cited

U.S. PATENT DOCUMENTS

2004/0218575 A1* 11/2004 Ibe .................... H04W 36/0011
370/338
2010/0241907 A1* 9/2010 Nakamura .......... G06F 11/0709
714/43
(Continued)

FOREIGN PATENT DOCUMENTS

KR    1020080011159    1/2008
KR    1020110073239    6/2011
WO    2012099338       7/2012

OTHER PUBLICATIONS

PCT International Application No. PCT/KR2015/004363, Written Opinion of the International Searching Authority dated Aug. 13, 2015, 25 pages.

*Primary Examiner* — Asad M Nawaz
*Assistant Examiner* — Jason A Harley
(74) *Attorney, Agent, or Firm* — Lee Hong Degerman Kang & Waimey

(57) ABSTRACT

An embodiment of the present invention relates to a service discovery method in which a first device supporting Wi-Fi direct service (WFDS) discovers a service, the method comprising the steps in which: a first device receives a discoverable notification from a second device; and the first device determines whether or not the service which becomes known via the discoverable notification is the service which the first device seeks, wherein the discoverable notification includes information on services supported by the second device which sends the discoverable notification.

4 Claims, 14 Drawing Sheets

(51) Int. Cl.
*H04W 72/04* (2009.01)
*H04L 29/06* (2006.01)
*H04W 4/50* (2018.01)
*H04W 92/18* (2009.01)
*H04W 84/12* (2009.01)

(58) Field of Classification Search
USPC .......................................... 710/303; 709/227
See application file for complete search history.

(56) References Cited

U.S. PATENT DOCUMENTS

| | | | |
|---|---|---|---|
| 2011/0158208 A1* | 6/2011 | Solanki | H04L 12/185 370/338 |
| 2013/0064175 A1* | 3/2013 | Pandey | H04W 8/005 370/328 |
| 2013/0067068 A1 | 3/2013 | Hassan et al. | |
| 2013/0346553 A1 | 12/2013 | Shin et al. | |
| 2014/0094212 A1* | 4/2014 | Ahn | H04W 4/70 455/517 |
| 2014/0301378 A1* | 10/2014 | Xu | H04L 41/12 370/338 |
| 2014/0351444 A1* | 11/2014 | Qi | H04W 76/021 709/227 |
| 2014/0351478 A1* | 11/2014 | Lee | H04W 4/08 710/303 |

* cited by examiner

FIG. 11

| | | |
|---|---|---|
| IP header | UDP header | UDP datagram |

| Field | Size (octets) | Value | Description |
|---|---|---|---|
| opcode | 1 | Refer to Tablge 1. | Opcode for each message are listed below in Table 1. |
| Sequence number | 1 | | Sequence number is incremented by 1, when the device sends a new message. |
| Payload | Variable | | Each message type defines a payload format. |

| Opcode | Message |
|---|---|
| 0 | REQUEST_SESSION |
| 1 | ADDED_SESSION |
| 2 | REJECTED_SESSION |
| 3 | REMOVE_SESSION |
| 4 | ALLOWED_PORT |
| 5 | VERSION |
| 6 | DEFERRED_SESSION |
| 7 | DISCOVERY_REQUEST |
| 8 | DISCOVERY_RESPONSE |
| 9 | DISCOVERABLE_NOTIFICATION |
| 10-253 | RESERVED |
| 254 | ACK |
| 255 | NACK |

SERVICE DISCOVERY METHOD AND DEVICE IN WIRELESS COMMUNICATION SYSTEM

CROSS-REFERENCE TO RELATED APPLICATIONS

This application is the National Stage filing under 35 U.S.C. 371 of International Application No. PCT/KR2015/004363, filed on Apr. 29, 2015, which claims the benefit of U.S. Provisional Application No. 61/985,478, filed on Apr. 29, 2014, the contents of which are all hereby incorporated by reference herein in their entirety.

TECHNICAL FIELD

The present disclosure relates to a wireless communication system, and more particularly, to a method and device for performing service discovery in Wi-Fi Direct.

BACKGROUND ART

Along with the recent development of information and communication technology, various wireless communication technologies have been developed. Among them, Wireless Local Area Network (WLAN) enables wireless access to the Internet based on radio frequency technology through a portable terminal such as a Personal Digital Assistant (PDA), a laptop computer, a Portable Multimedia Player (PMP) in a home, an office, or a specific service providing area.

The introduction of Wi-Fi Direct or Wi-Fi Peer-to-Peer (Wi-Fi P2P) is under discussion, as a direct communication technology that facilitates interconnection between devices without a wireless Access Point (AP) which is a basic requirement for a legacy WLAN system. According to Wi-Fi Direct, devices can be connected to each other without a complex establishment procedure and an operation for exchanging data at a communication rate offered by a general WLAN system can be supported to provide various services to users.

Recently, various Wi-Fi-enabled devices have been used. Among them, the number of Wi-Fi Direct-enabled devices which are Wi-Fi devices capable of communicating with each other without an AP is increasing. The Wi-Fi Alliance (WFA) has been discussing the introduction of a platform supporting various services (e.g., Send, Play, Display, Print, etc.) using a Wi-Fi Direct link. This may be referred to as Wi-Fi Direct Service (WFDS). According to WFDS, applications, services, etc. can be controlled or managed by a service platform called Application Service Platform (ASP).

A standard on a wireless LAN (WLAN) technology is developing in IEEE (Institute of Electrical and Electronic Engineers) 802.11 group. IEEE 802.11a and b use an unlicensed band in 2.4 GHz or 5 GHz and IEEE 802.11b provides transmission speed of 11 Mbps, and IEEE 802.11a provides transmission speed of 54 Mbps. IEEE 802.11g provides transmission speed of 54 Mbps by applying OFDM (Orthogonal Frequency Division Multiplexing) in 2.4 GHz. IEEE 802.11n provides transmission speed of 300 Mbps by applying MIMO-OFDM (Multiple Input Multiple Output-OFDM). IEEE 802.11n supports a channel bandwidth up to 40 MHz. In this case, IEEE 802.11n can provide transmission speed of 600 Mbps.

In WLAN environment according to IEEE 802.11e, a DLS (Direct Link Setup)-related protocol assumes that a BSS (Basic Service Set) corresponds to a QBSS (Quality BSS) supporting a QoS (Quality of Service). In the QBSS, not only a non-AP STA but also an AP corresponds to a QAP (Quality AP) that supports QoS. Yet, in a currently commercialized WLAN environment (e.g., WLAN environment according to IEEE 802.11a/b/g), although a non-AP STA corresponds to a QSTA (Quality STA) supporting QoS, most of APs correspond to a legacy AP incapable of supporting QoS. As a result, even a QSTA has a limit on using a DLS service in the currently commercialized WLAN environment.

A TDLS (Tunneled Direct Link Setup) corresponds to a wireless communication protocol newly proposed to overcome the aforementioned limit. Although the TDLS does not support QoS, the TDLS can make QSTAs establish a direct link in the currently commercialized WLAN environment such as IEE 802.11a/b/g and enable a direct link to be established in a PSM (power save mode). Hence, the TDLS regulates various procedures to make QSTAs establish a direct link in a BSS managed by a legacy AP as well. In the following, a wireless network supporting the TDLS is referred to as a TDLS wireless network.

A legacy wireless LAN mainly handles an operation of an infra structure BSS in which a wireless access point (AP) functions as a hub. An AP is in charge of a function of supporting a physical layer for establishing a wired/wireless connection, a function of routing devices in a network, a function of providing a service for adding/deleting a device to/from a network, and the like. In this case, the devices in the network are connected with each other via the AP and the devices are not directly connected with each other.

As a technology of supporting a direct connection between devices, discussion on establishing a standard for Wi-Fi Direct is in progress.

A Wi-Fi direct network corresponds to a network that Wi-Fi devices are able to perform D2D (Device to Device) (or P2P (Peer-to-Peer)) communication with each other although the Wi-Fi devices do not participate in a home network, an office network, and a hotspot network. The Wi-Fi direct network has been proposed by Wi-Fi Alliance. In the following, Wi-Fi Direct-based communication is referred to as Wi-Fi D2D communication (simply, D2D communication) or Wi-Fi P2P communication (simply, P2P communication). And, a device for performing the Wi-Fi P2P is referred to as a Wi-Fi P2P device, simply, a P2P device.

A WFDS network can include one or more Wi-Fi devices. A WFDS device includes devices supporting Wi-Fi such as a display device, a printer, a digital camera, a projector, a smartphone, and the like. And, the WFDS device includes a non-AP STA and an AP STA. WFDS devices belonging to a WFDS network can be directly connected with each other. Specifically, P2P communication may indicate a case that a signal transmission path between two WFDS devices is directly configured between the WFDS devices without passing through the third device (e.g., an AP) or a legacy network (e.g., accessing WLAN via an AP). In this case, the signal transmission path directly configured between the two WFDS devices can be restricted to a data transmission path. For example, the P2P communication may indicate a case that a plurality of non-STAs transmit data (e.g., voice/image/text message information, etc.) without passing through an AP. A signal transmission path for control information (e.g., resource allocation information for P2P configuration, wireless device identification information, etc.) can be directly configured between WFDS devices (e.g., between a non-AP STA and a non-AP STA, between a non-AP STA and an AP), can be configured between two devices (e.g., between a non-AP STA and a non-AP STA) via an AP, or can be configured between an AP and a corresponding WFDS device (e.g., between an AP and a non-AP STA #1, between an AP and a non-AP STA #2).

Wi-Fi Direct corresponds to a network connection standard technology for defining up to an operation of a link layer. Since a standard on an application, which is operating in a higher layer of a link configured by the Wi-Fi Direct, is not defined, when an application is executed after devices supporting the Wi-Fi Direct are connected with each other, it was difficult to support compatibility. In order to solve the aforementioned problem, discussion on standardizing such a higher layer application as a Wi-Fi direct service (WFDS) is in progress in Wi-Fi Alliance (WFA).

FIG. 1 illustrates components of a WFDS (Wi-Fi Direct Service) framework.

Referring to FIG. 3, a Wi-Fi Direct layer is a MAC layer defined by the Wi-Fi Direct standard. The Wi-Fi Direct layer may include software compatible with the Wi-Fi Direct standard. A wireless connection may be configured by a PHY layer (not shown) compatible with the Wi-Fi PHY layer, under the Wi-Fi Direct layer. A platform called Application Service Platform (APS) is defined above the Wi-Fi Direct layer.

The ASP is a common shared platform and performs session management, service command processing, and control and security between ASPs between its overlying Application layer and its underlying Wi-Fi Direct layer.

A Service layer is defined above the ASP. The Service layer includes use case-specific services. The WFA defines four basic services, Send, Play, Display, and Print. Also, an Enable Application Program Interface (API) is defined to use an ASP common platform when a third party application other than the basic services is supported.

While Send, Play, Display, Print, or services defined by third party applications are shown in FIG. 1 as exemplary services, the scope of the present invention is not limited thereto. For example, the term "service" may mean any of services supporting Wi-Fi Serial Bus (WSB), Wi-Fi Docking, or Neighbor Awareness Networking (NAN), in addition to Send, Play, Display, Print, or the services defined by the third party applications.

Send is a service and application that can perform file transfer between two WFDS devices. Play is a service and application that enable sharing or streaming of Digital Living Network Alliance (DLNS)-based Audio/Video (A/V), photos, music, etc. between two WFDS devices. Print is a service and application that enable output of text and photos between a device having content such as text, photos, etc. and a printer. Display is a service and application that enable screen sharing between a Miracast source and a Miracast sink of the WFA.

The Application layer may provide a User Interface (UI), represent information as a human-perceivable form, and provide a user input to a lower layer.

DISCLOSURE

Technical Problem

An object of the present invention devised to solve the problem lies in a method/procedure for performing service discovery.

It is to be understood that technical objects to be achieved by the present invention are not limited to the aforementioned technical object and other technical objects which are not mentioned herein will be apparent from the following description to one of ordinary skill in the art to which the present invention pertains.

Technical Solution

The object of the present invention can be achieved by providing a method for discovering a service by a first device supporting Wi-Fi Direct Service (WDS), the method including the first device receiving a discoverable notification from a second device, and determining whether a service indicated through the discoverable notification is a service searched for by the first device, wherein the discoverable notification contains information about a service supported by the second device, the second device transmitting the discoverable notification.

The discoverable notification may be transmitted immediately after the second device transmitting the discoverable notification is connected to a subnet.

The discoverable notification may be broadcast to devices within the subnet via an access point (AP).

The discoverable notification may include an IP header, a user datagram protocol (UDP) header, and a UDP datagram.

The UDP datagram may include one or more type length value (TLV) fields.

When the service searched for by the first device coincides with the service indicated through the discoverable notification, the first device may transmit a discovery request or SearchResult( )directed to a service layer.

When the first service searched for by the first device does not coincide with the service indicated through the discoverable notification, the first device may omit transmission of a discovery request or SearchResult( )directed to a service layer.

The first device may have Wi-Fi Direct layer 2 and layer 3 connections with the AP before receiving the discoverable notification.

The first device may have Wi-Fi Direct layer 2 and layer 3 connections with the second device before receiving the discoverable notification.

In another aspect of the present invention, provided herein is a method for supporting, by an access point (AP), service discovery of a device supporting Wi-Fi Direct Service (WDS), the method including receiving a discoverable notification from a second device, and broadcasting the received in discoverable notification, wherein the discoverable notification contains information about a service supported by the second device transmitting the discoverable notification.

The discoverable notification may be transmitted immediately after the second device transmitting the discoverable notification is connected to a subnet.

The discoverable notification may include an IP header, a user datagram protocol (UDP) header, and a UDP datagram.

The UDP datagram may include one or more type length value (TLV) fields.

When the service searched for by the first device coincides with the service indicated through the discoverable notification, the AP may receive a discovery request from the first device.

The AP may have Wi-Fi Direct layer 2 and layer 3 connections with the first device before receiving the discoverable notification.

The method may further include broadcasting the discoverable notification to a subnet.

Advantageous Effects

According to embodiments of the present invention, even if a service seeker does not perform a separate seek operation, it may recognize a service supported by a service advertiser.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIGS. 9 to 14 illustrate a service discovery procedure according to an embodiment of the present invention.

BEST MODE

Figure 1:
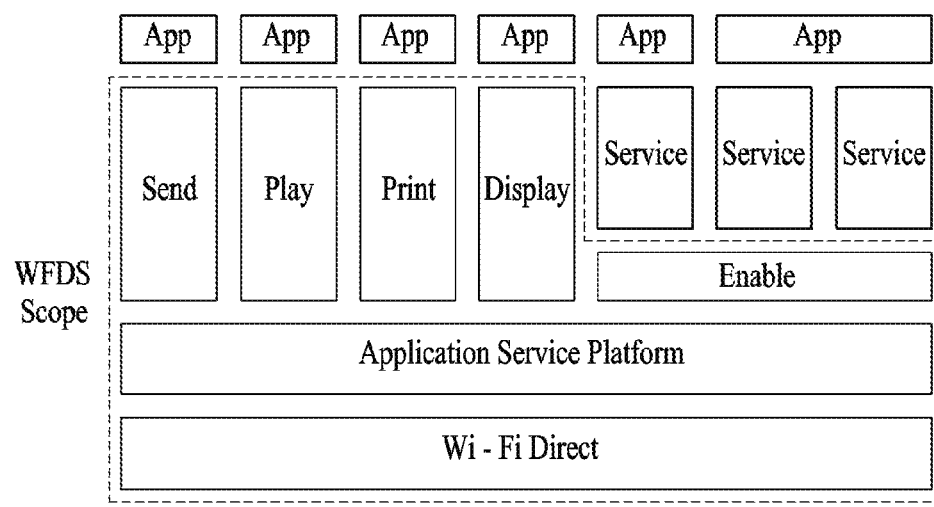
FIG. 1 illustrates an exemplary structure of a WFDS system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

Specific terms used for the embodiments of the present invention are provided to help the understanding of the present invention. These specific terms may be replaced with other terms within the scope and spirit of the present invention.

In some instances, to prevent the concept of the present invention from being ambiguous, structures and apparatuses of the known art will be omitted, or will be shown in the form of block diagram based on main functions of each structure and apparatus. Also, wherever possible, like reference numerals denote the same parts throughout the drawings and the specification.

The embodiments of the present invention can be supported by standard documents disclosed for at least one of wireless access systems, Institute of Electrical and Electronics Engineers (IEEE) 802 system, WiFi system, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those specifications. Further, all terms as set forth herein can be explained by the standard specifications.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as Institute of Electrical and Electronics Engineers (IEEE) 802.11 (Wi-Fi), IEEE 802.16 (WiMAX), IEEE 802-20, and evolved UTRA (E-UTRA).

Figure 2:
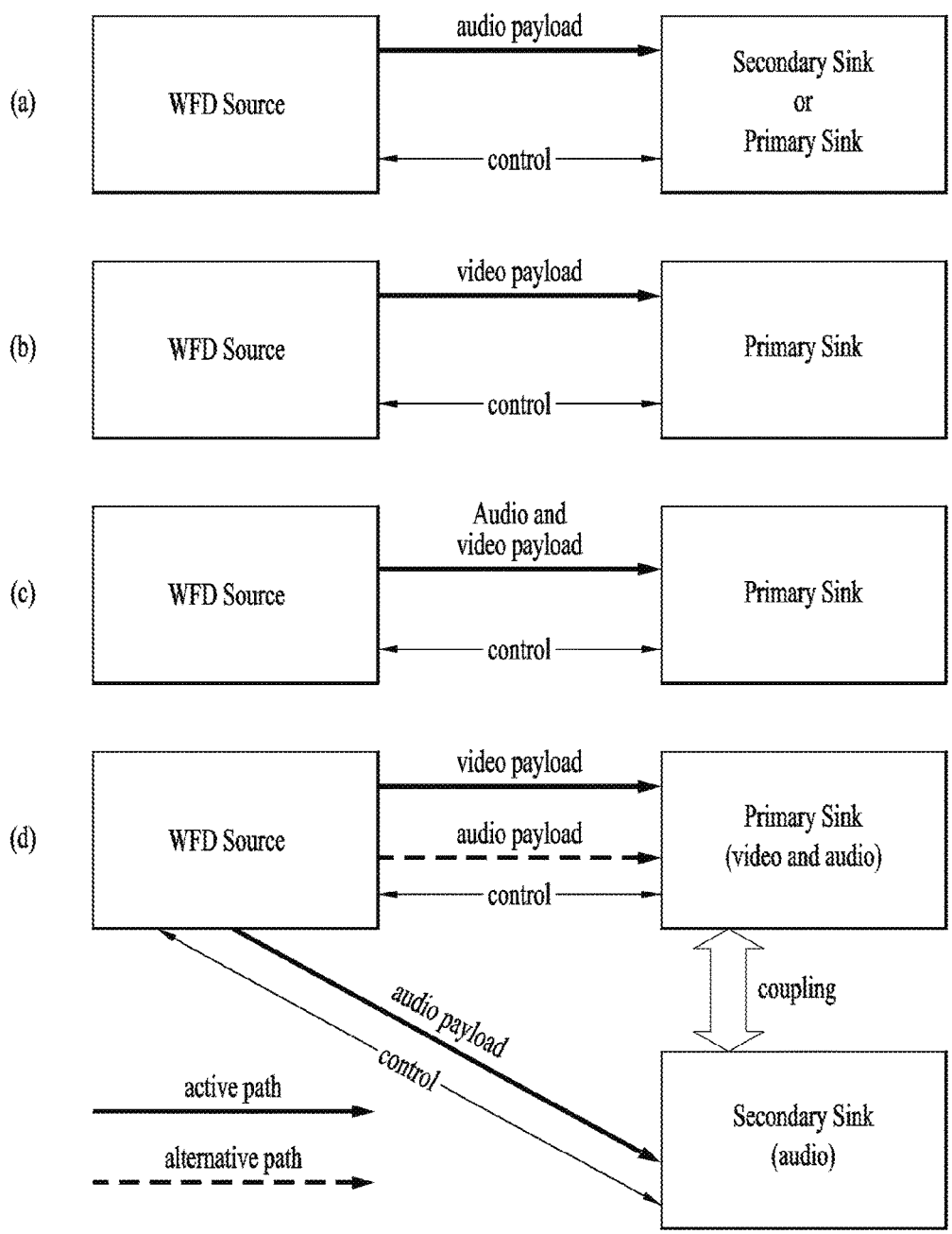
FIG. 2 illustrates examples of a WFD session.

FIG. 2 is a diagram for examples of a WFD session. FIG. 2(a) shows an audio-only session. A WFD source can be connected with either a primary sink or a secondary sink. FIG. 2(b) shows a video-only session. A WFD source is connected with a primary sink. FIG. 2(c) shows an audio session and a video session. Similar to the case of FIG. 2(b), a WFD sink can be connected with a primary sink only. FIG. 2(d) shows an example of a session connection in case of a coupled sink (coupled WFD sink). In this case, a primary sink and a secondary sink can perform rendering on video and audio, respectively. Alternately, the primary sink can perform rendering on both video and audio.

Figure 3:
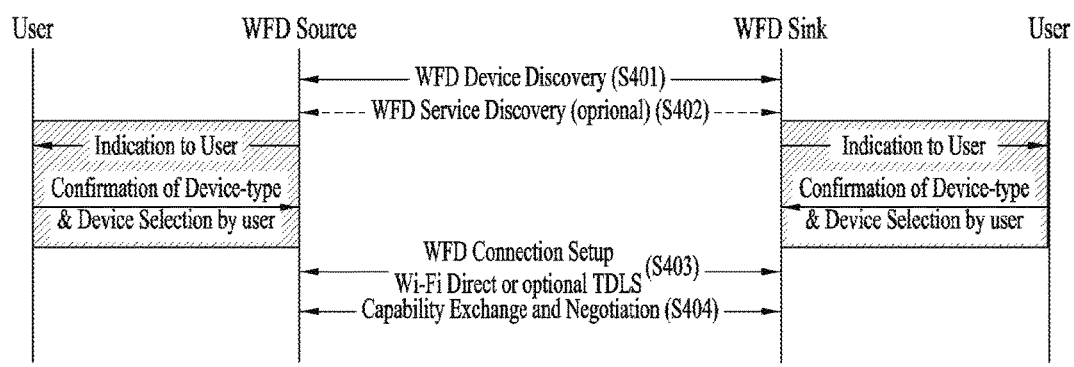
FIG. 3 illustrates procedures necessary for WMD session set up.

The aforementioned session can be established after procedures shown in FIG. 3 are performed. Specifically, a session can be established after a WFD device discovery procedure S401, a WFD service discovery procedure S402, a WFD connection setup procedure S403, and a capability exchange and negotiation procedure S404 are performed. In the following, the procedures are sequentially explained.

WMD Device Discovery

A WFD source may discover a peer device for WFD, namely a WFD sink though WFD device discovery.

Figure 4:
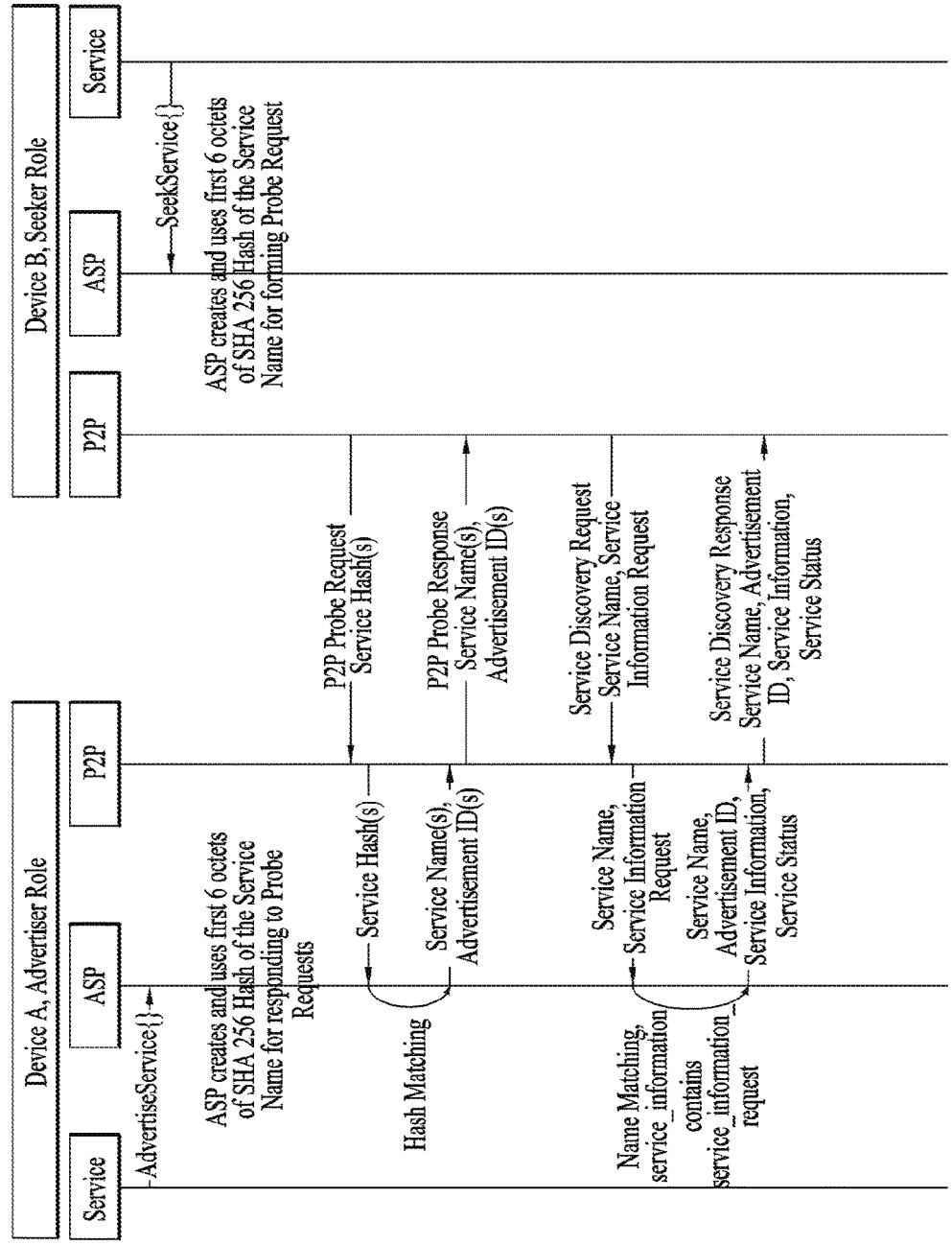
FIG. 4 illustrates a WFDS device/service discovery procedure.

To perform WFD device discovery, WFD devices may include a WFD information element (IE) in a beacon, a probe request frame, a probe response frame, and the like. Herein, the WFD IE is an information element including information related to the WFD such as a device type and a device status. Details will be described later. When a WFD device receives a probe request frame including a WFD IE, the WFD device may transmit a probe response frame including a WFD IE thereof in response. If the WFD device is associated with an infrastructure AP and operates as a Wi-Fi P2P device, the probe request frame may include a WFD IE, Wi-Fi simple configuration (WSC) IE and a P2P IE. The probe response frame, which is a response to the probe request frame, may be transmitted over a channel on which the probe request frame is received, and include a P2P IE, a WSC IE and a WFD IE. FIG. 4 illustrates a procedure of service discovery and device discovery defined in WFDS 1.0.

Other details of WFD device discovery which are not mentioned above may conform to the documents "Wi-Fi Display Technical Specification" and/or "Wi-Fi Peer-to-Peer (P2P) Technical Specification Wi-Fi Direct Service Addendum", and be applied to the following descriptions.

WFD Service Discovery

When necessary, WFD sources and/or WFD sinks having performed WFD device discovery may discover service capabilities of each other. Specifically, if any one WFD device transmits a service discovery request frame containing WFD capability as an information subelement, the counterpart WFD device may transmit a service discovery response frame containing the WFD capability thereof as an information subelement. To perform the service discovery procedure, the probe request frame and response frame which are used for the device discovery procedure may contain information indicating whether the WFD devices have capabilities to support the service discovery procedure.

Figure 5:
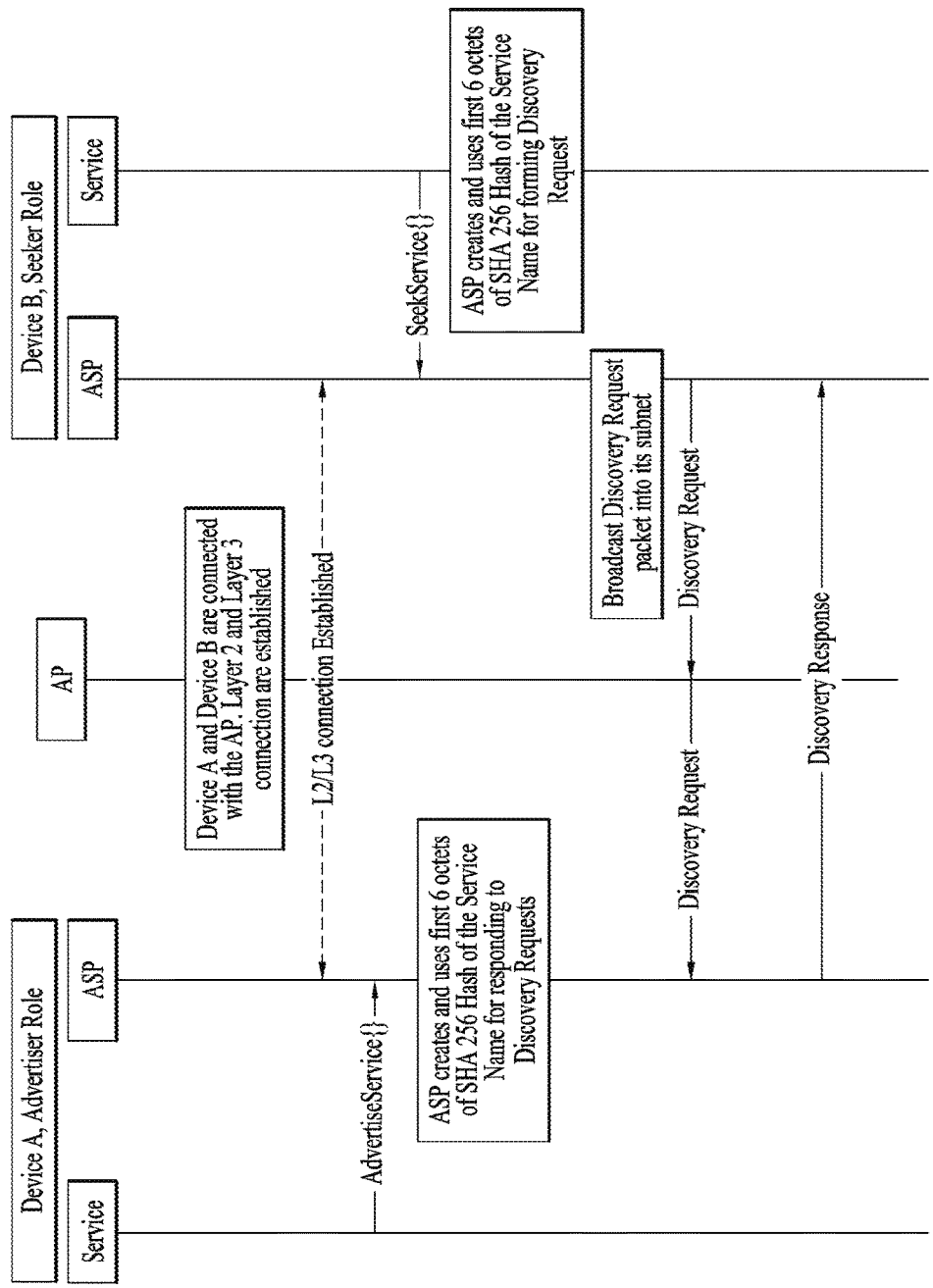
FIG. 5 illustrates discovery through UDP.

FIG. 5 illustrates a procedure of a seeker discovering a device and service through the UDP. When two devices are connected to an AP, a specific port (or an ASP coordination protocol port) is opened. Through this port, the ASP may broadcast a discovery request packet to the whole subnet. An advertiser receiving this packet matches the packet with a service, and unicasts a discovery response containing information about the corresponding device and service via the AP.

WFD Connection Setup

Figure 6:
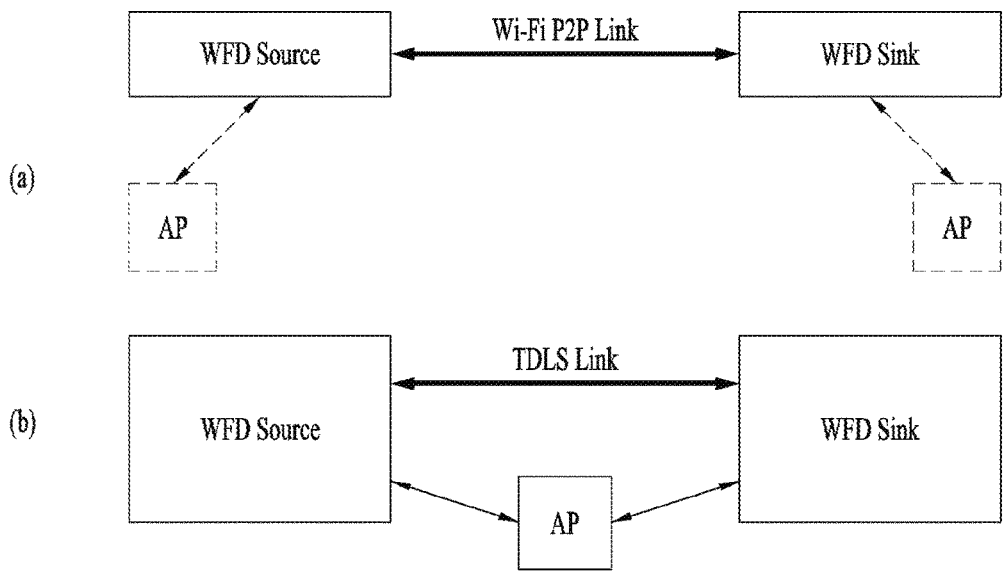
FIG. 6 illustrates a WFD connection topology.

Having performed the WFD device discovery procedure and optionally the WFD service discovery procedure, a WFD device can select a WFD device for performing the WFD connection setup procedure. After the WFD device for performing the WFD connection setup procedure is selected according to a policy, a user input, and the like, it may use a connectivity scheme among Wi-Fi P2P and TDLS for a WFD connection. WFD devices can determine a connectivity scheme based on preferred connectivity information and an associated BSSID sub-element which is delivered together with a WFD information element. FIG. 6(a) and FIG. 6(b) show a connection using the Wi-Fi P2P connectivity scheme and a connection using TDLS connectivity scheme. In FIG. 6(a), an AP may be common to a WFD source and a WFD sink or may be different to the WFD source and the WFD sink. Or, the AP may not exist. If a WFD connection is performed using the TDLS, as shown in FIG. 6(b), the WFD source and the WFD sink should maintain the connection with the AP.

WFD Capability Exchange and Negotiation

Figure 7:
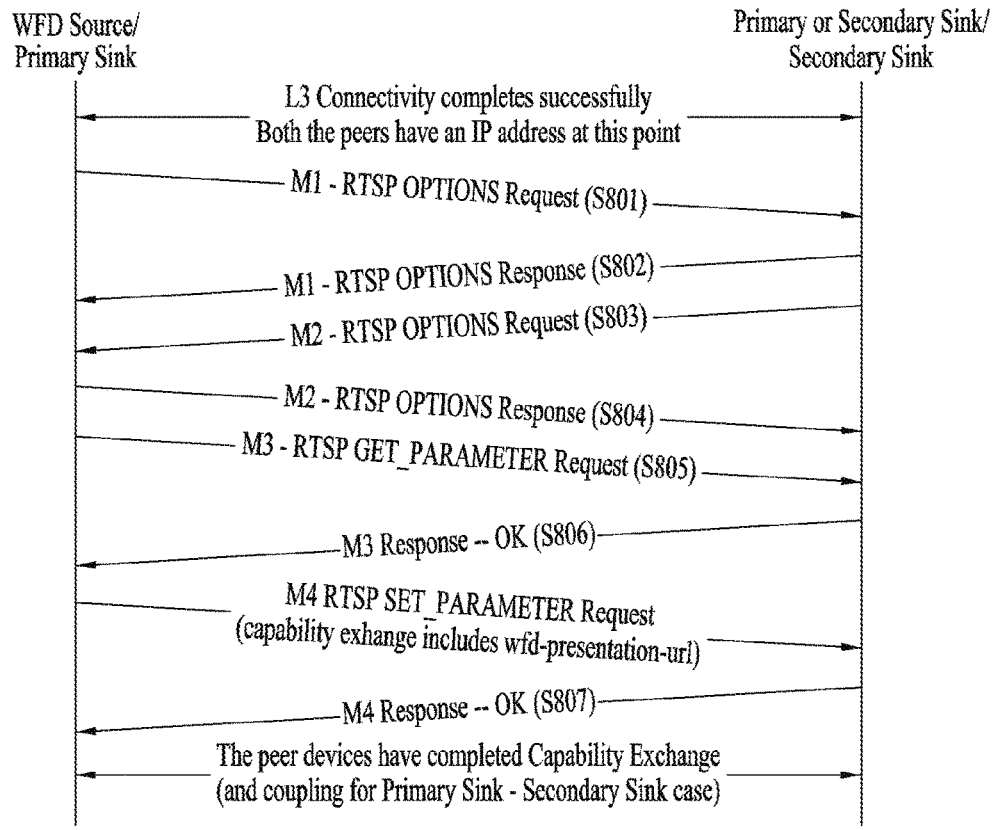
FIG. 7 illustrates exchange and negotiation of WFD capability.

If the WFD connection setup is performed between WFD devices, a WFD device can perform the WFD capability exchange and negotiation. A WFD source and a WFD sink can deliver at least one selected from the group consisting of information on a codec supported by both the WFD source and the WFD sink, profile information of the codec, level information of the codec and resolution information to the WFD device via the WFD capability negotiation. The WFD capability exchange and negotiation procedure can be performed by exchanging a message using an RTSP (real-time streaming protocol). And, it may be able to determine a parameter set for defining an audio/video payload during a WFD session. As shown in FIG. 7, the WFD capability exchange and negotiation procedure can be performed by exchanging RTSP M1 message to RTSP M4 message.

Specifically, the WFD source can transmit RSTP M1 request message to initiate an RSTP procedure and WFD capability negotiation [S801]. The RTSP M1 message can include an RTSP OPTIONS request for determining an RTSP methods set supported by the WFD sink. Having received the RTSP M1 request message, the WFD sink can transmit an RTSP M1 response message in which RTSP methods supported by the WFD sink are listed (S802).

Subsequently, the WFD sink can transmit an RTSP M2 request message for determining an RTSP method set supported by the WFD source [S803]. Having received the RTSP M2 request message, the WFD source can transmit an RTSP M2 response message in which RTSP methods supported by the WFD source are listed in response to the RTSP M2 request message (S804).

The WFD source can transmit an RTSP M3 request message (RTSP GET_PARAMETER request message) in which a list of WFD capabilities is specified (S805). Having received the RTSP M3 request message, the WFD sink can transmit an RTSP M3 response message (RTSP GET_PARAMETER response message) in response to the RTSP M3 request message.

The WFD source determines an optimized parameter set to be used for a WFD session based on the RTSP M3 response message and can transmit an RTSP M4 request message (RTSP SET PARAMETER request message) including the determined parameter set to the WFD sink (S806). Having received the RTSP M4 request message, the WFD sink can transmit an RTSP M4 response message (RTSP SET PARAMETER response message) (S806).

WFD Session Establishment

Figure 8:
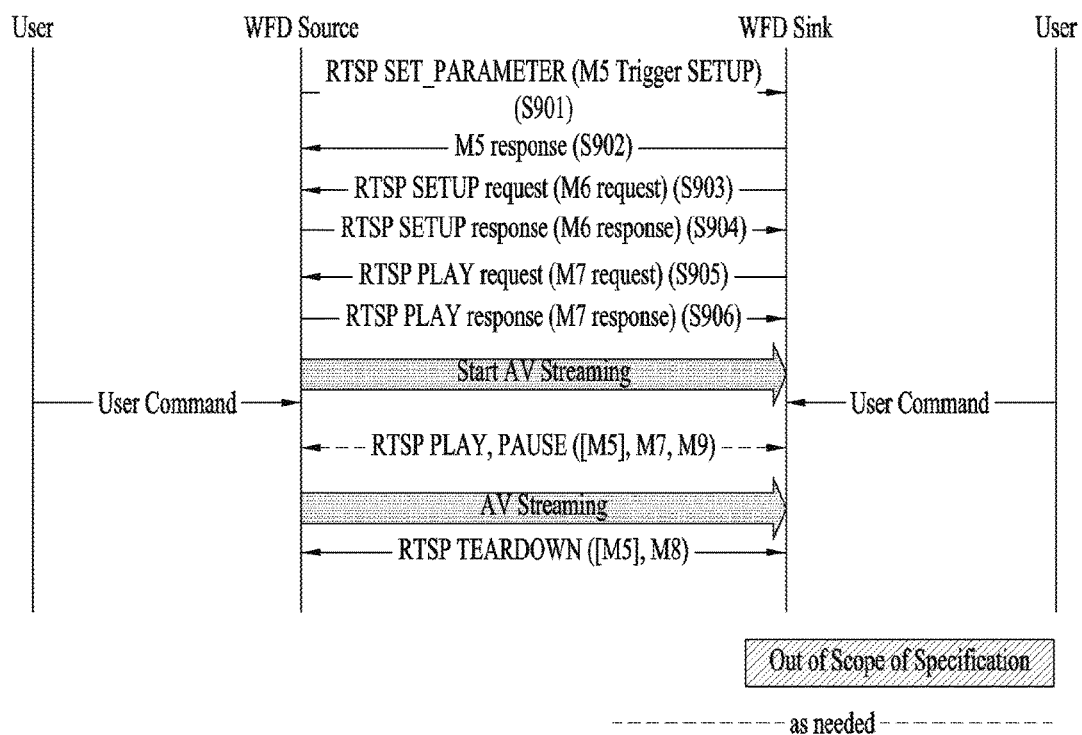
FIG. 8 illustrates setting up a WFD session.

Having performed the WFD capability exchange and negotiation, the WFD devices can establish a WFD session via procedures shown in FIG. 8. Specifically, the WFD source can transmit an RTSP SET parameter request message (RTSP M5 Trigger SETUP request) to the WFD sink (S901). The WFD sink can transmit an RTSP M5 response message (RTSP M5 response) to the WFD source in response to the RTSP SET parameter request message.

If the RTSP M5 message including a trigger parameter SETUP is successfully exchanged, the WFD sink can transmit an RTSP SETUP request message (RTSP M6 request) to the WFD source. Having received the RTSP M6 request message, the WFD source can transmit an RTSP SETUP response message to the WFD sink in response to the RTSP M6 request message. If a status code of the RTSP M6 response message indicates 'OK', it may indicate that an RTSP session is successfully established.

After the RTSP M6 message is successfully exchanged, the WFD sink can transmit an RTSP PLAY request message (RTSP M7 request) to the WFD source to indicate that the WFD sink is ready to receive an RTP stream. The WFD source can transmit an RTSP PLAY response message (RTSP M7 response) to the WFD sink in response to the RTSP PLAY request message. In this case, if a status code of the RTSP PLAY response message indicates 'OK', it may indicate that a WFD session is successfully established. After the WFD session is established, the WFD source can transmit an RTSP M3 request message (RTSP GET_PARAMETER request message) for obtaining capability on at least one or more RTSP parameters supported by the WFD sink, an RTSP M4 request message for setting at least one or more RTSP parameter values corresponding to a WFD session to renegotiate capability between the WFD source and the WFD sink to update an AV (audio/video) format, an RTSP M5 request message for triggering the WFD sink to transmit an RTSP PAUSE request message (RTSP M9 request message), an RTSP M12 request message for indicating that the WFD source enters a WFD standby mode, an RTSP M14 request message for selecting an input type to be used in UIBC, an input device and other parameters, an RTSP M15 request message for enabling or disenabling UIBC, and the like to the WFD sink.

Subsequently, the WFD sink can transmit an RTSP M7 request message (RTSP PLAY request message) for initiating (or resuming) audio/video streaming, an RTSP M9 request message (RTSP PAUSE request message) for pausing audio/video streaming to the WFD sink from the WFD source, an RTSP M10 request message for asking the WFD source to change an audio rendering device, an RTSP M11 request message for indicating to change an active connector type, an RTSP M12 request message for indicating that the WFD sink enters a WFD standby mode, an M13 request message for asking the WFD source to refresh IDR, an RTSP M14 request message for selecting an input type to be used in UIBC, an input device and other parameters, an RTSP M15 request message for enabling or disenabling UIBC, and the like to the WFD source. Having received the aforementioned RTSP request message from the WFD sink, the WFD source can transmit an RTSP response message to the WFD sink in response to the RTSP request message.

If a WFD session is established and audio/video streaming is initiated, the WFD source and the WFD sink can perform audio/video streaming using a codec supported by both the WFD source and the WFD sink. Since the codec supported by both the WFD source and the WFD sink is used, it is able to guarantee interoperability between the WFD source and the WFD sink.

WFD Information Element

WFD communication is performed based on WFD IE. A frame format of the WFD IE is shown in Table 1 in the following.

TABLE 1

| Field | Size (octets) | Value (Hexadecimal) | Description |
|---|---|---|---|
| Element ID | 1 | DD | IEEE 802.11 vendor specific usage |
| Length | 1 | Variable | Length of the following fields in the IE in octets. The length field is variable and set to 4 plus the total length of WFD subelements. |
| OUI | 3 | 50-6F-9A | WFA Specific OUI (Organizationally Unique Identifier) |
| OUI Type | 1 | 0A | Identifying the type or version of the WFD IE. Setting to 0x0A indicates WFA WFD v1.0 |
| WFD subelements | Variable | | One or more WFD subelements appear in the WFD IE |

As shown in Table 1, similar to a legacy P2P IE, a WFD IE includes an element ID field, a length field, a WFD-specific OUI field, an OUI type field indicating a type/version of the WFD IE, and a WFD subelement field. The WFD subelement field has a form shown in Table 2 in the following.

TABLE 2

| Field | Size (octets) | Value (Hexadecimal) | Description |
|---|---|---|---|
| Subelement ID | 1 | | Identifying the type of WFD subelement. (For details, refer to Table 3) |
| Length | 2 | Variable | Length of the following fields in the subelement |
| Subelements body field | Variable | | Subelement specific information fields |

TABLE 3

| Subelement ID (Decimal) | Notes |
|---|---|
| 0 | WFD Device Information |
| 1 | Associated BSSID |
| 2 | WFD Audio Formats |
| 3 | WFD Video Formats |
| 4 | WFD 3D Video Formats |
| 5 | WFD Content Protection |
| 6 | Coupled Sink Information |
| 7 | WFD Extended Capability |
| 8 | Local IP Address |
| 9 | WFD Session Information |
| 10 | Alternative MAC Address |
| 11-255 | Reserved |

The subelement field of 1 octet indicates information included in the WFD subelement field. Specifically, values 0, 1, . . . 10 included in the subelement field can indicate that each of subelements corresponds to WFD Device Information subelement, Associated BSSID subelement, WFD Audio Formats subelement, WFD Video Formats subelement, WFD 3D Video Formats subelement, WFD Content Protection subelement, Coupled Sink Information subelement, WFD Extended Capability subelement, Local IP Address subelement, WFD Session Information subelement, Alternative MAC Address subelement, respectively. In this case, the WFD Device Information subelement includes informations necessary for determining whether to attempt pairing with a WFD device and session generation. The Associated BSSID subelement is used to indicate an address of a currently associated AP. The WFD Audio Formats subelement, the WFD Video Formats subelement, and the WFD 3D Video Formats subelement are used to indicate capability of a WFD device related to audio, video, and 3D video, respectively. The WFD Content Protection subelement delivers information on a content protection scheme and the Coupled Sink Information subelement delivers information on a status of a coupled sink, MAC address, and the like. The WFD Extended Capability subelement is used to deliver information on various capabilities of other WFD device and the Local IP Address subelement is used to deliver an IP address to a WFD peer in a TDLS setup procedure. The WFD Session Information subelement includes such information as a list of WFD device information descriptions in a WFD group. If a WFD connection scheme requires an interface (e.g., MAC address) different from an interface used in device discovery, the Alternative MAC Address subelement can deliver information on the interface.

Subsequently, the Subelement body field includes detail information of a subelement corresponding to a subelement ID. For example, in case of the WFD Device Information subelement, as shown in Table 4 in the following, the subelement body field can include a WFD Device Information subfield including information on a WFD device, a Session Management Control Port subfield indicating TCP port information for receiving an RTSP message, and a WFD Device Maximum Throughput subfield indicating information on a maximum average throughput.

TABLE 4

| Field | Size (octets) | Value | Description |
|---|---|---|---|
| Subelement ID | 1 | 0 | Identifying the type of WFD subelement. (For details, refer to Table 3) |
| Length | 2 | 6 | Length of the following fields of the subelement. |
| WFD Device Information | 2 | | Refer to Table 5 |
| Session Management Control Port | 2 | Valid TCP port | Default 7236. TCP port at which the WFD Device listens for RTSP messages. (If a WFD Sink that is transmitting this subelement does not support the RTSP server function, this field is set to all zeros.) The WFD Device can choose any value other than default 7236. |
| WFD Device Maximum Throughput | 2 | | Maximum average throughput capability of the WFD Device represented in multiples of 1 Mbps |

TABLE 5

| Bits | Name | Interpretation |
|---|---|---|
| 1:0 | WFD Device Type bits | 0b00: WFD Source<br>0b01: Primary Sink<br>0b10: Secondary Sink<br>0b11: dual-role possible, i.e., either a WFD Source or a Primary Sink |
| 2 | Coupled Sink Operation Support at WFD Source bit | 0b0: Coupled Sink Operation not supported by WFD Source.<br>0b1: Coupled Sink Operation supported by WFD Source<br>This bit is valid for WFD Device Type bits set to value 0b00 or 0b11. When WFD Device Type bits value is 0b01 or 0b10, the value of this b2 is ignored upon receiving. |
| 3 | Coupled Sink Operation Support at WFD Sink bit | 0b0: Coupled Sink Operation not supported by WFD Sink<br>0b1: Coupled Sink Operation supported by WFD Sink<br>This bit is valid for WFD Device Type bits set to value 0b01, 0b10 or 0b11. When WFD Device Type bits value is 0b00, the value of this b3 is ignored upon receiving. |
| 5:4 | WFD Session Availability bits | 0b00: Not available for WFD Session<br>0b01: Available for WFD Session<br>0b10, 0b11: Reserved |
| 6 | WSD Support bit | 0b0: WFD Service Discovery (WSD): Not supported<br>0b1: WFD Service Discovery (WSD): Supported |
| 7 | PC bit | 0b0: Preferred Connectivity (PC): P2P<br>0b1: Preferred Connectivity (PC): TDLS |
| 8 | CP Support bit | 0b0: Content Protection using the HDCP system 2.0/2.1: Not supported<br>0b1: Content Protection using the HDCP system 2.0/2.1: Supported |
| 9 | Time Synchronization Support bit | 0b0: Time Synchronization using 802.1AS: Not supported<br>0b1: Time Synchronization using 802.1AS: Supported |
| 10 | Audio un-supported at Primary Sink bit | 0b0: all cases except below<br>0b1: If B1B0 = 0b01 or 0b11, and this WFD Device does not support audio rendering when acting as a Primary Sink |

TABLE 5-continued

| Bits | Name | Interpretation |
|---|---|---|
| 11 | Audio only support at WFD Source bit | 0b0: all cases except below<br>0b1: If B1B0 = 0b00 or 0b11, and this WFD Device supports transmitting audio only elementary stream when acting as a WFD Source |

Hereinafter, the service discovery procedure according to an embodiment of the present invention will be described based on the above description.

Figure 9:
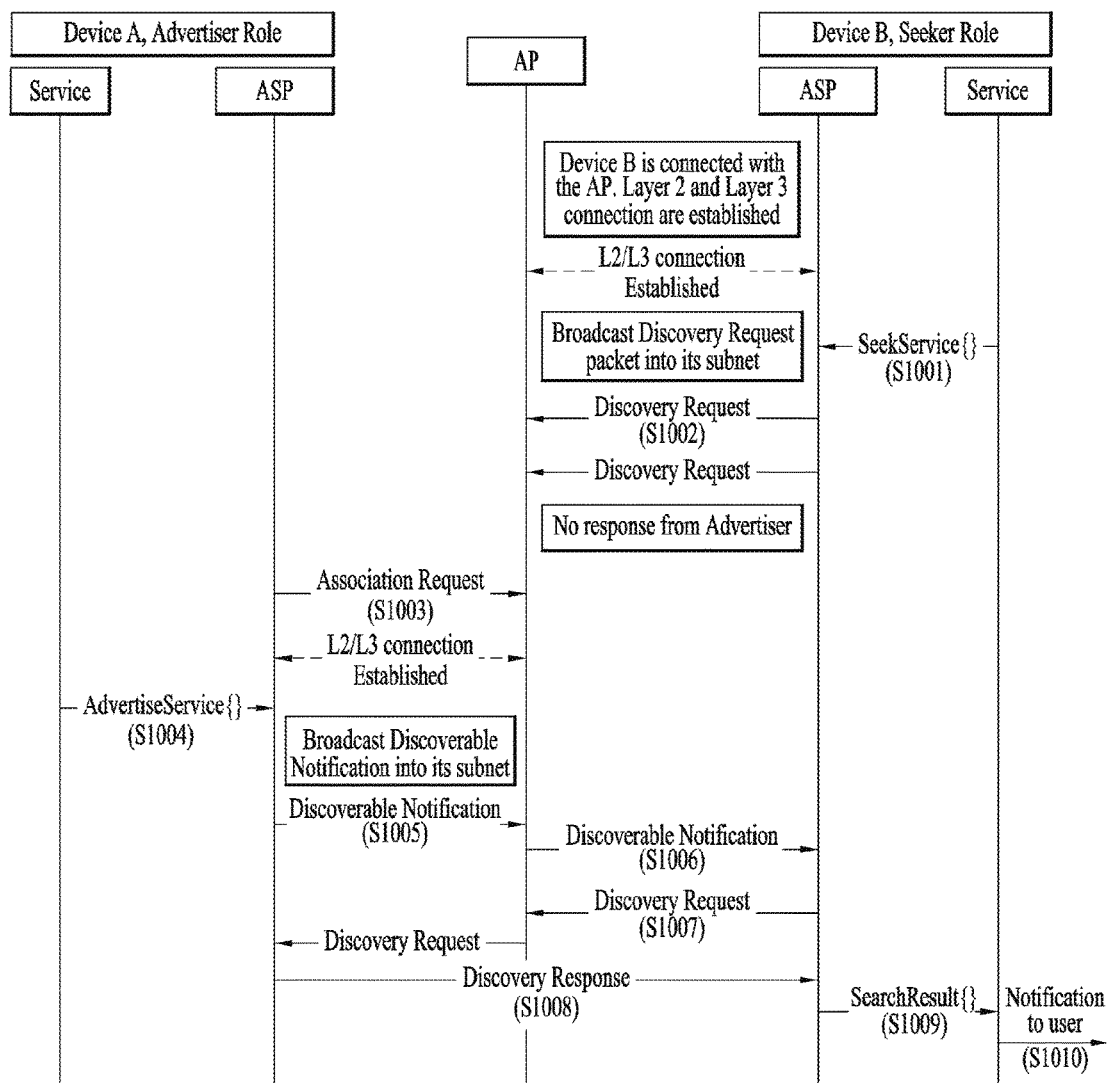

FIG. 9 illustrates a discovery procedure according to an embodiment of the present invention. First, in view of a first device (Device B), which serves as a seeker, after the first device is connected to an AP, layer 2 and layer 3 connections are established. The service layer of the first device transmits a SearchService( )method to the ASP layer (S1001). The first device broadcasts a discovery request to a subnet via the ASP layer (S1002). Since there is no peer that provides a service corresponding to the discovery request, the response can be received. In this state, a second device (Device A), which serves as an advertiser, may receive a discoverable notification transmitted by the first device (after a certain time passes) (S1006).

Herein, the discoverable notification may contain information about a service supported by the second device, which transmits the discovery notification. Accordingly, it may be determined whether the service indicated through the discoverable notification coincides with a service that the first device is searching for. If the service that the first device is searching for coincides with the service indicated through the discoverable notification, the first device may make a discovery request (S1007) or transmit SearchResult( )to the service layer (S1009). The first device may broadcast or unicast the discovery request (S1007). After the AP receives the discovery request, the AP may in turn broadcast the request to the subnet. If the second device receives the discovery request, the second device may receive a discovery response in response to the request (S1008). Once the second device recognizes the details of the service after receiving the discovery response, the second device may inform the user that there is a device that supports an available service on the current network. This operation may be performed in a manner that the ASP layer transmits SearchResult( )to the service layer (S1009), and the service layer displays a notification to the user (S1010).

Figure 10:
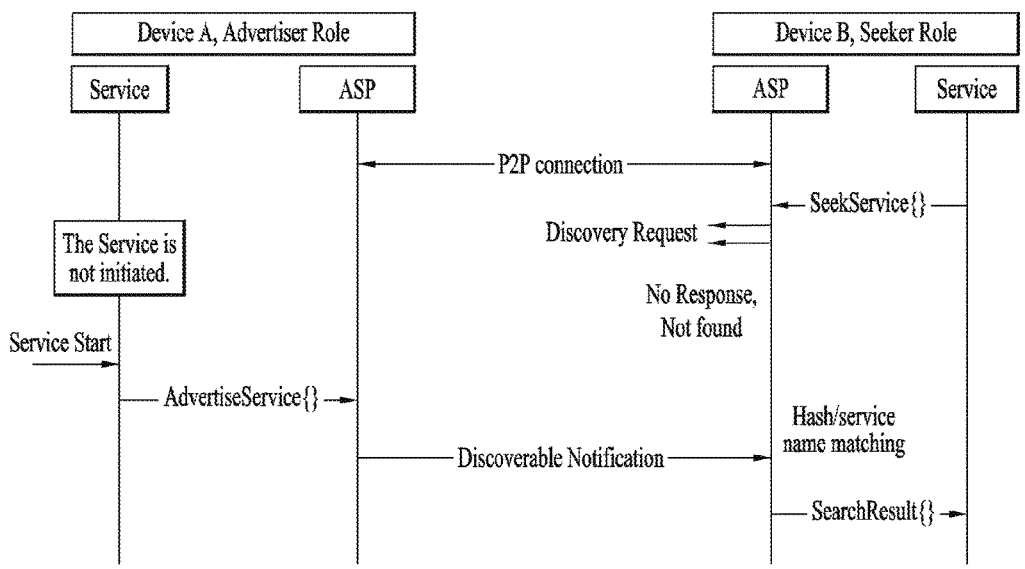

FIG. 10 illustrates another embodiment of the present invention. The description given above may also be applied to a case where the first device (Device B) and a second device (Device a) already have a Wi-Fi Direct connection. As shown in FIG. 10, the first device broadcasts a discovery request in order to search for a service for the currently established connection. However, if the service is not currently initiated or advertised, the second device does not send a response to the discovery request. The second device (Device A), which serves as an advertiser, may receive a discoverable notification transmitted by the first device (after a certain time passes).

As described above, if the second device operates as a service advertiser, the discoverable notification may be transmitted immediately after the first and second devices are connected to the subnet. Alternatively, the discoverable notification may be broadcast by the second device as soon as the second device is connected to the network. That is, in FIG. 10, the second device may transmit an association request to the AP (S1003), and establish L2/L3 connections.

Thereafter, the second device may transmit a discoverable notification to the AP (S1005). While the AdvertiseService( )method is illustrated in FIG. 10 as being called after connection to the network, it may be called before connection to the network.

As described above, the discoverable notification may include an IP header, a user datagram protocol (UDP) header, and a UDP datagram. That is, the discoverable notification may be packetized according to UDP (or TCP) and generated/delivered from the IP upper layer. This packet may be defined by the ASP coordination protocol or a new UDP discovery protocol. FIG. 11 illustrates a case where the discoverable notification is defined by the ASP coordination protocol (CP). As illustrated in FIG. 11, the UDP datagram may include an opcode field, a sequence number field, and a payload field. Herein, the opcode value may indicate the type of the message. As illustrated in FIG. 11, opcode 9 may indicate discoverable notification.

Figure 12:
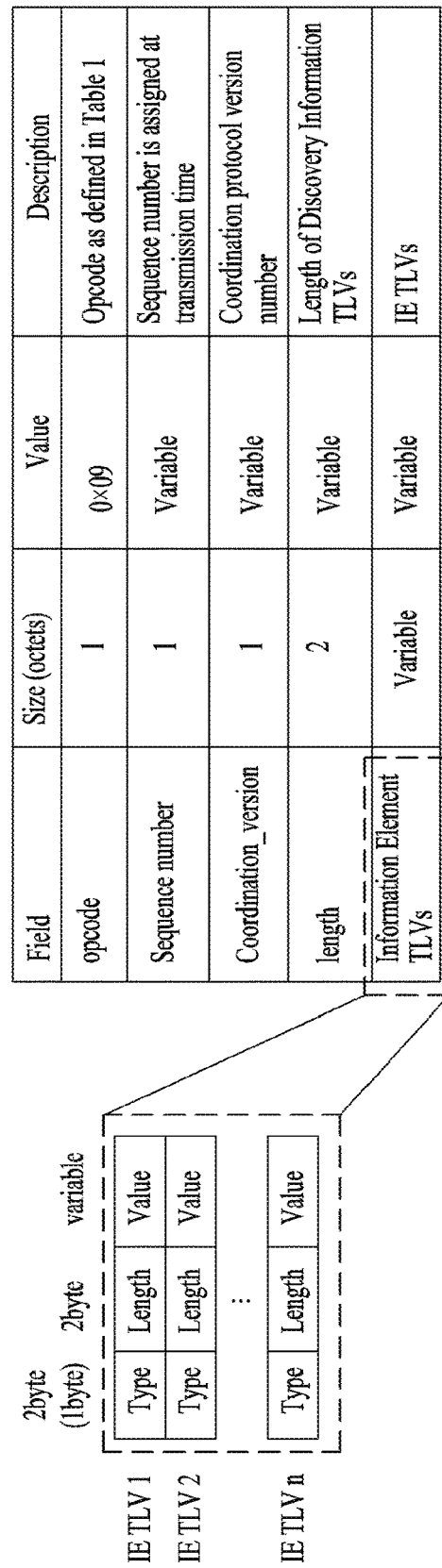

The UDP datagram may include one or more type length value (TLV) fields. An example of the TLV fields is illustrated in FIG. 12. As described above, the discoverable notification message is a UDP packet which may be broadcast to the subnet. When a device joins the network, the service that the device supports may be broadcast to the network through the discoverable notification message. To implement the discoverable notification message, all attributes in the form of TLV may be included in an information element (IE) defined by the P2P standard and WFDS standard in the IE TLV field of the discoverable notification. In addition, attributes defined by the WFA in addition to the P2P standard and attribute type information to be included in the IE later may all be included in the IE TLV field. In particular, an advertised service information attribute defined in specification of WFDS P2P addendum may be included in the field.

Figure 13:
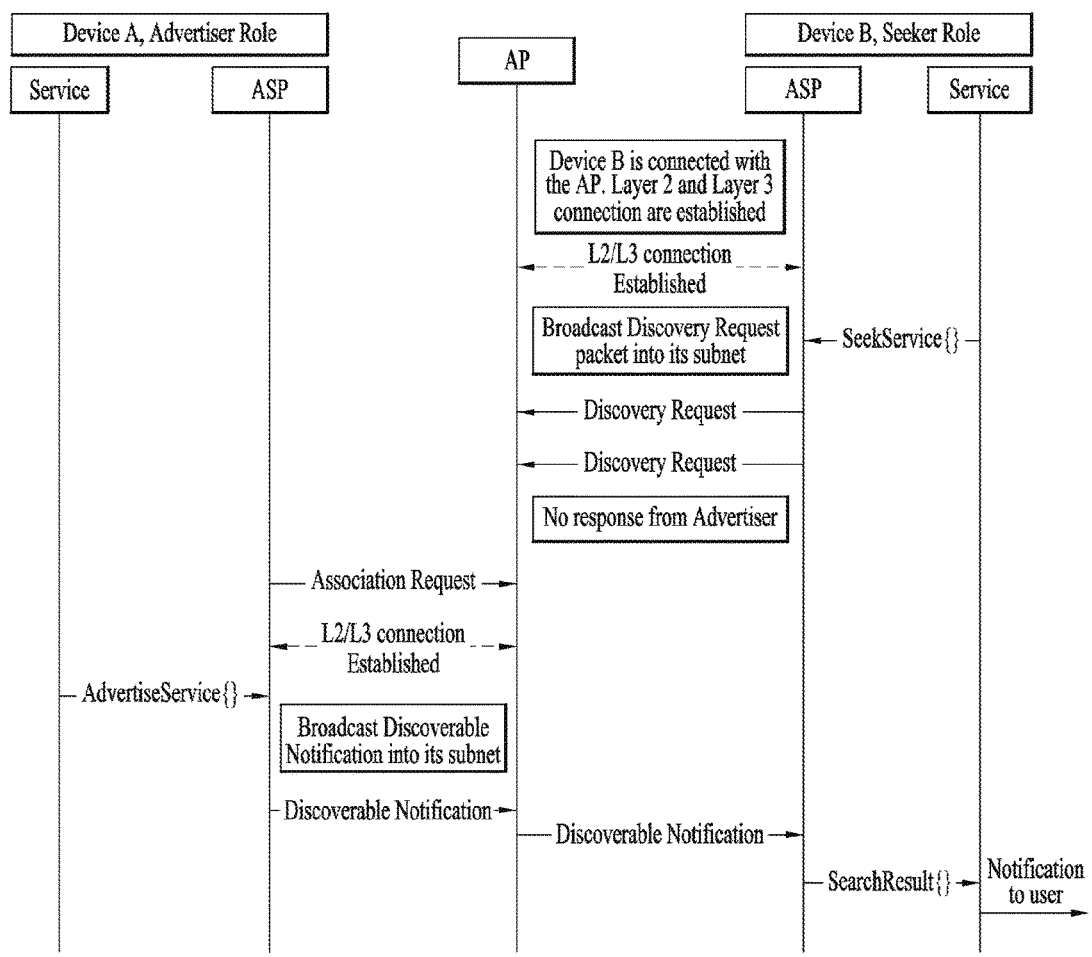

FIG. 13 illustrates a discoverable notification procedure according to another embodiment of the present invention. In the procedure illustrated in FIG. 13, the procedure of discovery request and/or discovery response is not performed, in contrast with the example of FIG. 12. If information sufficient to initiate a service is included in the IE TLV field in the discoverable notification message, the service seeker may not require the procedure of discovery request and discovery response. That is, the service seeker sends the SearchResult( )event to the service using only the discoverable notification message, and notifies the user that new service discovery has been completed.

Figure 14:
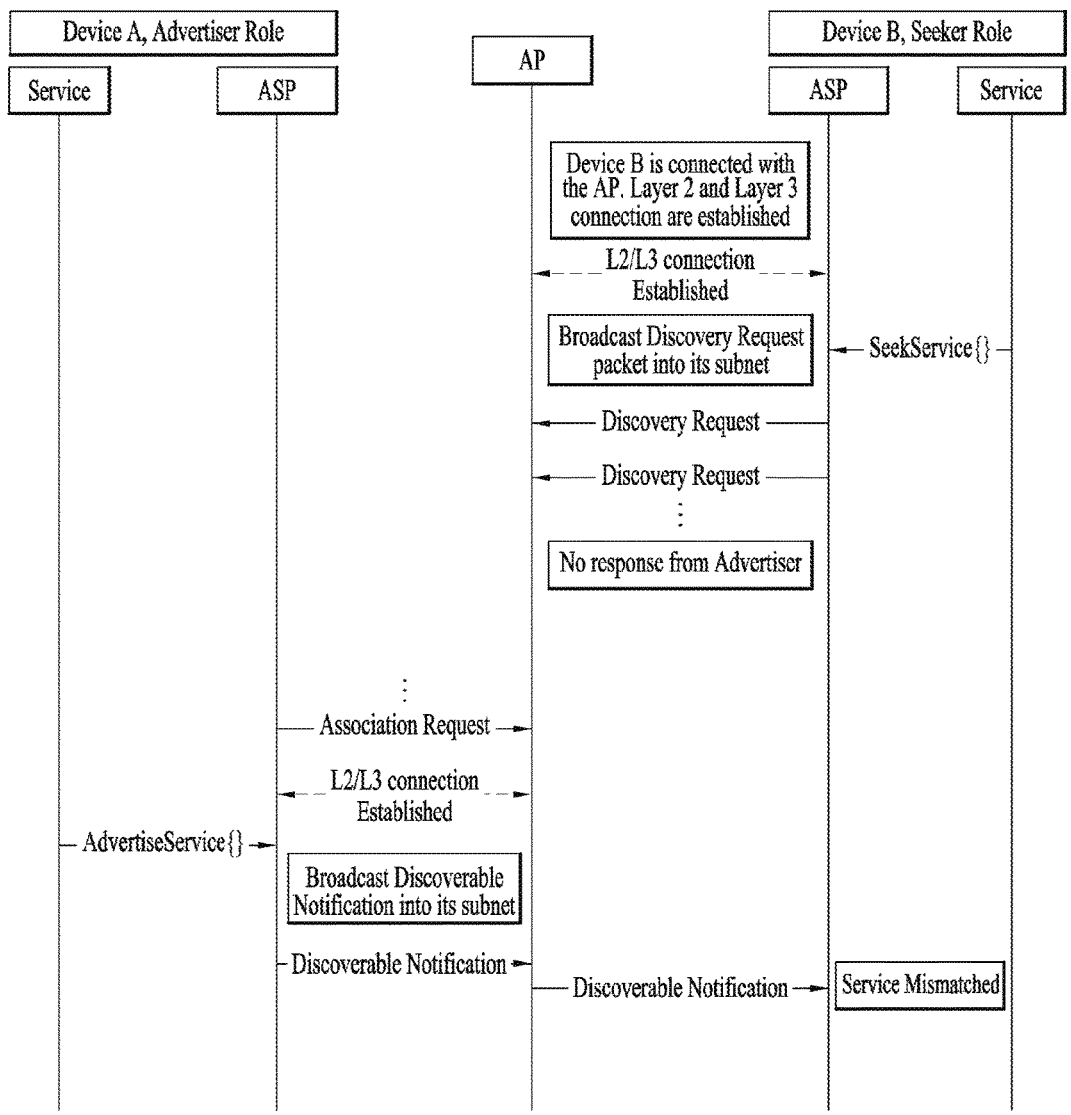

FIGS. 10 and 13 illustrate a case where a discoverable notification transmitted by the second device provides a service that the first device is searching for. In contrast, FIG. 14 illustrates a case where the discoverable notification does not provide a service that the first device is searching for. Specifically, even if the service seeker receives the discoverable notification message, it may not send a discovery request and/or a higher service. For example, if a newly joined device supports a print reception service org.wi-fi.wfds.print.rx while the seeker has initially discovered a service org.wi-fi.wfds.send.rx, namely a file transmission/reception service, it is not necessary to signal the service discovery result to the higher service from the perspective of the service seeker.

According to the embodiment described above, even if the services sector which is already connected to the network does not perform a separate seek operation (passively), it may recognize a service supported by the service advertiser.

Figure 15:
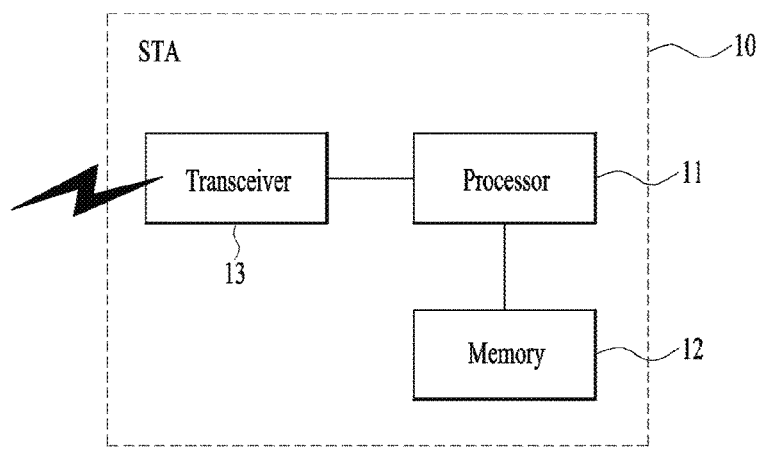
FIGS. 15 and 16 are block diagrams illustrating radio-frequency devices according to an embodiment of the present invention.

FIG. 15 is a block diagram illustrating configuration of a radio-frequency device according to an embodiment of the present invention.

A radio-frequency device 10 may include a processor 11, a memory 12, and a transceiver 13. The transceiver may transmit/receive a radio signal and implement, for example, a physical layer according to the IEEE 802 system. The processor 11 may be electrically connected to the transceiver 13 to implement a MAC layer and/or physical layer according to the IEEE 802 system. In addition, the processor 11 may be configured to perform operation of at least one of the application, service and ASP layer according to various embodiments of the present invention described above or to perform an operation related to a device operating as an AP/STA. In addition, a module for implementing operation of a radio-frequency device according to various embodiments of the present invention may be stored in the memory 12, and executed by the processor 11. The memory 12 may be included in the processor 11, or may be installed outside the processor 11 and connected to the processor 11 by a well-known means.

Specific configuration of the radio-frequency device 10 of the FIG. 15 may be implemented such that elements in the various embodiments of the present invention described above are independently applied or two or more of the embodiments are applied simultaneously. For clarity, redundant description will be omitted.

Figure 16:
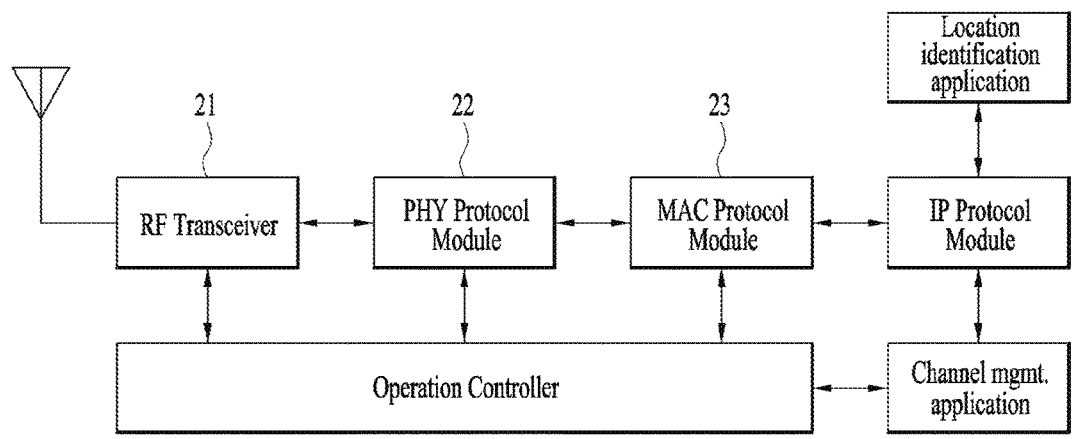

FIG. 16 is a diagram illustrating another configuration of a radio-frequency device according to an embodiment of the present invention.

In FIG. 16, an RF transceiver 21 serves to transfer information created by the PHY protocol module 22 to an RF spectrum and to transmit the same through an antenna through filtering/amplification or to transfer an RF signal received through the antenna to a band in which the signal can be processed by the PHY protocol module and process a procedure such as filtering necessary for the RF signal. The transceiver may also have a switching function of switching between the functions of transmission and reception.

The PHY protocol module 22 serves to perform processing of data required by the MAC protocol module 23 including FEC encoding and modulation, and insertion of an additional signal including a preamble, a pilot, and the like and transfer the processed data to the RF transceiver, and also serves to process a signal received from the RF transceiver through processes such as demodulation, equalization, FEC decoding and elimination of a signal added by the PHY layer and to deliver the processed data to the MAC protocol module. To this end, the PHY protocol module may include a modulator, a demodulator, an equalizer, an FEC encoder, and an FEC decoder.

The MAC protocol module 23 performs a procedure necessary for delivery or transmission of the data transmitted from a higher layer to the PHY protocol module, and takes charge of additional transmissions for implementation of basic communication. To this end, the MAC protocol module 23 serves to appropriately process data required by a higher layer to be transmitted such that the processed data is delivered or transmitted to the PHY protocol module and to process the received data delivered from the PHY protocol module and deliver the processed data to the higher layer. The MAC protocol module 23 also takes charge of additional transmission/reception necessary for delivery of data, thereby serving to process a communication protocol.

The embodiments of the present invention may be implemented through various means, for example, hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. Thus, the present invention is not intended to be limited to the embodiments described herein, but is intended to have the widest scope corresponding to the principles and novel features disclosed herein.

INDUSTRIAL APPLICABILITY

Various embodiments of the present invention have been described above, focusing on IEEE 802.11 system. However, the embodiments are also applicable to various mobile communication systems in the same manner.

The invention claimed is:

1. A method for discovering a service by a first device supporting Wi-Fi Direct Service, the method performed by the first device and comprising:

searching for a specific Wi-Fi Direct service by broadcasting a discovery request signal;

receiving a discoverable notification from an access point (AP) associated with the first device, the discoverable notification including information indicating that a second device is newly associated with the AP after the discovery request signal was broadcast and information related to Wi-Fi Direct services supported by the second device, wherein the discoverable notification is received immediately after the second device is connected to a subnet;

wherein the discoverable notification is transmitted over an IP packet including an IP header, a user datagram protocol (UDP) header, and one or more type length value (TLV) fields, wherein attribute information for the Wi-Fi Direct services is obtained only in the one or more TLV fields;

determining whether all of the attribute information for the specific Wi-Fi Direct service is included in the one or more TLV fields; and notifying that the search for the specific Wi-Fi Direct service is completed without transmitting the discovery request signal to the second device when the all of the attribute information for the specific Wi-Fi Direct service is included in the one or more TLV fields.

2. The method according to claim 1, wherein the first device has Wi-Fi Direct layer 2 and layer 3 connections with the AP before receiving the discoverable notification.

3. The method according to claim 1, wherein the first device has Wi-Fi Direct layer 2 and layer 3 connections with the second device before receiving the discoverable notification.

4. The method according to claim 1, further comprising broadcasting the received discoverable notification to devices within a subnet via the AP.

* * * * *